US012645513B2

(12) United States Patent
Xu et al.

(10) Patent No.: US 12,645,513 B2
(45) Date of Patent: Jun. 2, 2026

(54) CLIENT LIVE KEEPING METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Shili Xu, Shenzhen (CN); Kai Hong, Shenzhen (CN); Qitian Zhang, Shenzhen (CN); Jingjing Chen, Shenzhen (CN); Zhuan Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 539 days.

(21) Appl. No.: 17/973,613

(22) Filed: Oct. 26, 2022

(65) Prior Publication Data
US 2023/0056294 A1 Feb. 23, 2023

Related U.S. Application Data

(63) Continuation of application No. PCT/CN2022/073659, filed on Jan. 25, 2022.

(30) Foreign Application Priority Data

Feb. 4, 2021 (CN) .......................... 202110166643.3

(51) Int. Cl.
 *G06F 9/54* (2006.01)
 *G06F 9/48* (2006.01)
(52) U.S. Cl.
 CPC .............. *G06F 9/545* (2013.01); *G06F 9/485* (2013.01); *G06F 9/543* (2013.01); *G06F 9/4812* (2013.01); *G06F 9/4893* (2013.01)

(58) Field of Classification Search
 CPC .......... G06F 9/545; G06F 9/543; G06F 9/485; G06F 9/4893; G06F 9/4812
 See application file for complete search history.

(56) References Cited

U.S. PATENT DOCUMENTS 9,690,748 B1 6/2017 Roy et al.
9,712,632 B2 * 7/2017 Chen ........................ H04L 67/55
 (Continued)

FOREIGN PATENT DOCUMENTS

CN 107463435 A 12/2017
CN 109857544 A * 6/2019 ............... G06F 9/50
 (Continued)

OTHER PUBLICATIONS

English Translation of Foreign Patent Document: CN-110187753-A (Year: 2019).*

(Continued)

*Primary Examiner* — Kevin L Young
*Assistant Examiner* — Jennifer Marie Gutman
(74) *Attorney, Agent, or Firm* — Sughrue Mion, PLLC

(57) ABSTRACT

Example embodiments provide a client live keeping method and apparatus, and a storage medium. The method includes: receiving, based on a client being switched to a background, a request including state information of a target state of the client at a current time and a target live keeping duration corresponding to the target state; transmitting the request to a terminal server; receiving, from the terminal server in response to the request, target information indicating live keeping information of the target state; and determining whether to perform live keeping on the target state based on the target information.

15 Claims, 7 Drawing Sheets

(56) References Cited

U.S. PATENT DOCUMENTS

| | | | |
|---|---|---|---|
| 10,817,307 B1 * | 10/2020 | De La Cropte De Chanterac ...... G06F 1/3212 | |
| 2012/0210326 A1 * | 8/2012 | Torr ........................ H04W 4/50 | 718/103 |
| 2013/0061249 A1 * | 3/2013 | Schwartz, Jr. .......... G06F 9/445 | 718/100 |
| 2014/0020085 A1 * | 1/2014 | Srour ..................... G06F 9/468 | 726/17 |
| 2014/0113611 A1 * | 4/2014 | Ye ........................ H04W 24/02 | 455/418 |
| 2015/0256476 A1 * | 9/2015 | Kurtzman ............. G06F 9/5016 | 709/226 |
| 2016/0036722 A1 * | 2/2016 | Obrecht ............. G06F 11/3409 | 709/226 |
| 2017/0185788 A1 * | 6/2017 | Qiu .................. H04M 1/72406 | |
| 2018/0254995 A1 * | 9/2018 | Ji .............................. G06F 9/50 | |
| 2018/0321970 A1 * | 11/2018 | Cortes .................. G06F 9/4843 | |
| 2018/0336060 A1 * | 11/2018 | Liu ....................... G06F 3/0481 | |
| 2019/0095250 A1 * | 3/2019 | Qiang ................... G06F 9/5005 | |
| 2020/0241917 A1 * | 7/2020 | Chen ..................... G06F 9/4843 | |
| 2020/0356682 A1 * | 11/2020 | Gu ..................... G06F 21/6218 | |
| 2020/0394051 A1 * | 12/2020 | Chen .................. G06F 9/44505 | |
| 2021/0182099 A1 * | 6/2021 | Ochoa ................... G06F 9/4881 | |
| 2021/0208906 A1 * | 7/2021 | Hands .................... G06F 9/485 | |
| 2022/0188145 A1 * | 6/2022 | Kumar ................. G06F 9/5016 | |

FOREIGN PATENT DOCUMENTS

| | | | | |
|---|---|---|---|---|
| CN | 109992310 A | | 7/2019 | |
| CN | 110187753 A | * | 8/2019 | .......... G06F 1/3206 |
| CN | 110489215 A | | 11/2019 | |
| CN | 111309395 A | | 6/2020 | |
| CN | 112099757 A | | 12/2020 | |
| CN | 112162836 A | * | 1/2021 | .......... G06F 16/901 |

OTHER PUBLICATIONS

English Translation of Foreign Patent Document CN-109857544-A (Year: 2019).*

Translation of Foreign Patent Document CN-112162836-A (Year: 2020).*

International Search Report of PCT/CN2022/073659 dated Mar. 28, 2022 [PCT/ISA/210].

Written Opinion of PCT/CN2022/073659 dated Mar. 28, 2022 [PCT/ISA/237].

Chinese Office Action issued Jun. 28, 2025 in Application No. 202110166643.3.

* cited by examiner

CLIENT LIVE KEEPING METHOD AND APPARATUS, ELECTRONIC DEVICE, AND STORAGE MEDIUM

CROSS-REFERENCE TO RELATED APPLICATION(S)

This application is a continuation application of International Application No. PCT/CN2022/073659, filed Jan. 25, 2022, which claims priority to Chinese Patent Application No. 202110166643.3, filed with the National Intellectual Property Administration, PRC on Feb. 4, 2021, the disclosures of which are herein incorporated by reference in their entireties.

FIELD

The disclosure relates to the field of computer technologies, and in particular, to a client live keeping method and apparatus, an electronic device, and a storage medium.

BACKGROUND

In accordance with rapid development of software technologies and the need for improvement of daily lives, various client applications are provided. Generally, one terminal device is installed with a plurality of clients; these clients share resources of the terminal device. During the running process of the clients, a client generally needs to switch to a background state, for example, the client is a game client, and when a user answers a phone during a game running state A, at this time, the game client needs to be switched to be run at the background.

Due to limited resources of the terminal device, to ensure the performances and power consumption of the terminal device, the background clients would periodically be terminated, causing that the running state of the client is lost when the user switches the client back to a foreground again, and the terminal device needs to reload the client, which severely affects user experience. To solve the technical problem above, the terminal device needs to perform live keeping on certain clients according to user needs: live keeping refers to that after the client (APP) is switched to the background, the terminal device still ensures the background running state of the client.

However, there is currently no effective mode for performing live keeping on the client needed by the user.

SUMMARY

According to an aspect of an example embodiment, a client live keeping method, performed by a terminal device, includes:

receiving, based on a client being switched to a background, a request including state information of a target state of the client at a current time and a target live keeping duration corresponding to the target state;

transmitting the request to a terminal server;

receiving, from the terminal server in response to the request, target information indicating live keeping information of the target state; and determining whether to perform live keeping on the target state based on the target information.

According to an aspect of an example embodiment, a client live keeping method, performed by a terminal device, includes:

receiving a request from a terminal device, the request including state information of a target state of a client running on the terminal device at a current time and a target live keeping duration corresponding to the target state;

determining whether the target state is permissible according to at least one of the state information of the target state or the target live keeping duration of the target state; and transmitting target information to the terminal device based on determining that the target state is permissible, the target information indicating live keeping information of the target state, and the target information causing the terminal device to determine whether to perform live keeping on the target state according to the target information.

According to an aspect of an example embodiment, a client live keeping method, performed by a client, includes:

obtaining state information of a target state of the client at a current time based on the client being switched to a background;

transmitting a first request to a client server, the first request including the state information of the target state;

receiving a target live keeping duration corresponding to the target state from the client server; and transmitting a second request to the terminal device, the second request including state information of the target state and a target live keeping duration corresponding to the target state; the second request being used for indicating the terminal device to transmit the second request to the terminal server, and after receiving the target information which is returned by the terminal server and used for indicating the live keeping information of the target state, determining whether to perform live keeping on the target state according to the target information.

According to an aspect of an example embodiment, a client live keeping method, performed by a terminal, includes:

receiving a first request transmit based on a client being switched to a background, the first request including state information of a target state of the client at a current time;

determining a target live keeping duration corresponding to the target state according to the state information of the target state; and transmitting the target live keeping duration corresponding to the target state to the client; the target live keeping duration being used for triggering the terminal device running the client to transmit a second request to a terminal server, the second request carrying state information of the target state and the target live keeping duration, and also being used for triggering the terminal device to determine whether to perform live keeping on the target state according to the target information after receiving the target information which is returned by the terminal server and used for indicating the live keeping information of the target state.

According to an aspect of an example embodiment, a client live keeping apparatus, performed by a terminal device, includes:

at least one memory configured to store program code; and at least one processor configured to read the program code and operate as instructed by the program code, the program code including:

request receiving code configured to cause the at least one processor to receive, based on a client being switched to a background, a request comprising state information of a target state of the client at a current time and a target live keeping duration corresponding to the target state;

transmitting code configured to cause the at least one processor to transmit the request to a terminal server;

information receiving code configured to cause the at least one processor to receive, from the terminal server in response to the request, target information indicating live keeping information of the target state; and determining code configured to cause the at least one processor to determine whether to perform live keeping on the target state based on the target information.

According to an aspect of an example embodiment, a client live keeping apparatus, performed by a terminal server, includes:

at least one memory configured to store program code; and at least one processor configured to read the program code and operate as instructed by the program code, the program code including:

receiving code configured to cause the at least one processor to receive a second request transmit from the terminal device, the second request including state information of a target state of the client at a current time and a target live keeping duration corresponding to the target state;

processing code configured to cause the at least one processor to determine whether the target state is permissible according to at least one of the state information of the target state and the target live keeping duration corresponding to the target state; and transmitting code configured to cause the at least one processor to transmit target information to the terminal device in response to determining that the target state is permissible, the target information being used for indicating live keeping information of the target state; the target information being used for triggering the terminal device to determine whether to perform live keeping on the target state according to the target information.

According to an aspect of an example embodiment, a client live keeping apparatus, performed by a client, includes:

at least one memory configured to store program code; and at least one processor configured to read the program code and operate as instructed by the program code, the program code including:

processing code configured to cause the at least one processor to obtain state information of a target state of the client at a current time based on the client being switched to a background;

transmitting code configured to cause the at least one processor to transmit a first request to a client server, the first request including the state information of the target state;

receiving code configured to cause the at least one processor to receive a target live keeping duration corresponding to the target state transmit by the client server; and the transmitting code being further configured to cause the at least one processor configured to transmit a second request to the terminal device, the second request including state information of the target state and a target live keeping duration corresponding to the target state; the second request being used for indicating the terminal device to transmit the second request to the terminal server, and after receiving the target information which is returned by the terminal server and used for indicating the live keeping information of the target state, determining whether to perform live keeping on the target state according to the target information.

According to an aspect of an example embodiment, a client live keeping apparatus, performed by a client server, includes:

at least one memory configured to store program code; and at least one processor configured to read the program code and operate as instructed by the program code, the program code including:

receiving code configured to cause the at least one processor to receive a first request transmit based on a client being switched to a background, the first request including state information of a target state of the client at a current time;

processing code configured to cause the at least one processor to determine a target live keeping duration corresponding to the target state according to the state information of the target state; and transmitting code configured to cause the at least one processor to transmit the target live keeping duration corresponding to the target state to the client; the target live keeping duration being used for triggering the terminal device running the client to transmit a second request to a terminal server, the second request carrying state information of the target state and the target live keeping duration, and also being used for triggering the terminal device to determine whether to perform live keeping on the target state according to the target information after receiving the target information which is returned by the terminal server and used for indicating the live keeping information of the target state.

According to an aspect of an example embodiment, an electronic device, includes a processor and a memory, the memory storing computer-readable instructions, the computer-readable instructions, when executed by the processor, causing the one or more processors to perform the client live keeping method.

According to an aspect of an example embodiment, one or more non-transitory readable storage media store computer-readable instructions, the computer-readable instructions, when executed by one or more processors, causing the one or more processors to perform the client live keeping method.

According to an aspect of an example embodiment, a computer program product, includes a computer program, the computer program being stored in a readable storage medium. At least one processor of a computer may read the computer program from the readable storage medium, the at least one processor performing the computer program causing the computer to implement the client live keeping method.

BRIEF DESCRIPTION OF THE DRAWINGS

Accompanying drawings herein are incorporated into the specification and constitute a part of this specification, show embodiments that conform to the disclosure, and are used for describing a principle of the disclosure together with this specification.

DETAILED DESCRIPTION

The following describes the technical solutions in the embodiments of the disclosure with reference to the accompanying drawings in the embodiments of the disclosure.

It is to be understood that in the embodiments of the present invention, "B corresponding to A" indicates that B is associated with A. In an implementation, B may be determined based on A. However, it is to be further understood that determining B based on A does not mean that determining B only based on A, and B may be determined based on A and/or other information.

In the descriptions of the disclosure, unless otherwise stated, "a plurality of" means two or more than two.

In addition, for ease of describing the technical solutions in the embodiments of the disclosure clearly, in the embodiments of the disclosure, words such as "first" and "second" are used to distinguish same or similar items with a basically same function and role. A person of ordinary skill in the art would understand that the words such as "first" and "second" do not define the amount and the operating sequence, and the words such as "first" and "second" are not necessarily different.

The embodiment of the disclosure relates to the technical field of Internet of Things, and in particular, to a client live keeping method, apparatus, and system.

Figure 1:
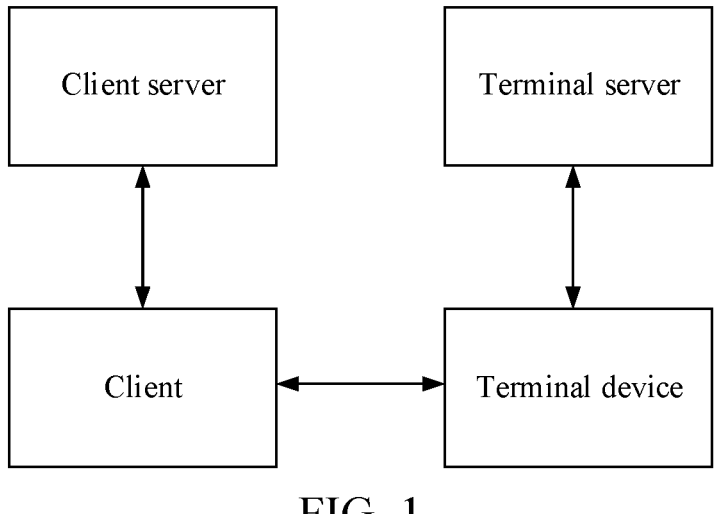
FIG. 1 is a schematic diagram of an application environment of an example embodiment of the disclosure.

FIG. 1 is a schematic diagram of an application environment of an example embodiment of the disclosure, which includes as shown in FIG. 1: a client, a terminal device, a client server, and a terminal server.

The client or a user side, refers to a program corresponding to a server and providing a local service for a customer. The client may be understood as an application (APP); the client is installed on the terminal device and runs on the terminal device. The client indicated by the disclosure may be understood as the client of any type, for example, music type, game type, shopping type, video type, etc.

The client server is in communicative connection to the client, and manages data related to the client.

The terminal device may also be referred to as a smart terminal or mobile smart terminal, and may relate to a type of devices that have rich human-computer interaction modes, own a capability of accessing the Internet, generally carry various operating systems, and have a relatively strong processing capability. The terminal device includes a smart phone, a tablet computer, a vehicle-mounted terminal, a handheld game console, etc.

The terminal servers are generally used on a LAN for connecting many terminal devices to a host system or a small computer system. The terminal device is connected to the terminal server through a serial port. The terminal server is basically an asynchronous multiplexer for connecting terminal devices, modems, printers, and other peripherals to the host system.

Live keeping refers to keeping (or maintaining) the client to be in a running state when the client is switched from the front-end to the background.

In FIG. 1, the client is installed on the terminal device and may be communicated with the terminal device and the client server; the terminal device may be communicated with the terminal server.

Resources of the terminal device include CPU, internal storage, GPU, network, and other resources of the terminal device.

The following describes the technical solutions in the embodiments of the disclosure in detail through some embodiments. The following several embodiments may be mutually combined, and same or similar concepts or processes may not be repeatedly described in some embodiments.

Figure 2:
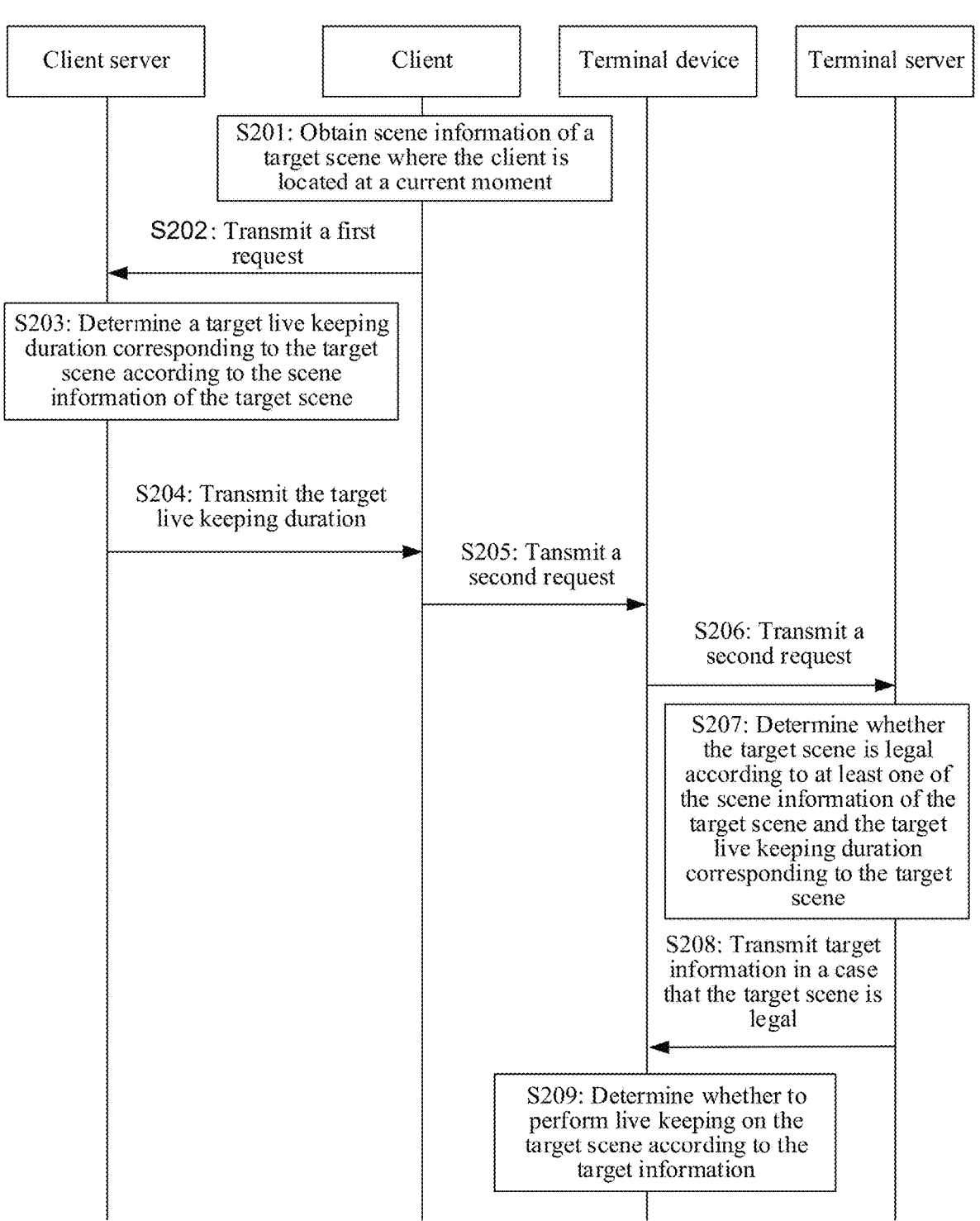
FIG. 2 is a schematic flowchart of a client live keeping method provided by an embodiment of the disclosure.

FIG. 2 is a schematic flowchart of a client live keeping method provided by an embodiment of the disclosure, which includes S201-S298 as shown in FIG. 2:

S201: A client obtains scene information (or state information) of a target scene (or state) where the client is located at a current moment (or current time) in a case that the client is switched to a background. Hereinafter, terms such as "scene information" or "target scene" may be referred to as "state information" or "target state."

In the process of the client running in a foreground of the terminal device, the client is switched from the foreground of the terminal device to running at the background due to some reasons. The states that cause the client to be switched from the foreground of the terminal device to running at the background are generally divided into a state of passively switching to the background and a state of actively switching to the background;

where the state of passively switching to background; in the running process of the client, the user needs to temporarily switch the client to the background because of the need to temporarily deal with other things, such as answering phone calls and replying messages, and generally the user would return to the current interface of the client again;

the state of actively switching to background; the type of states are generally a brief interruption in the client running process, for example, a character dying in a limited client (e.g., game application), and waiting for a teammate to enter the next game, etc.

A client includes several different states. The disclosure sets a unique identity for each state, such as a state ID, for uniquely identifying each state.

Due to the limited resources of the terminal device, when the client is switched to the background, the terminal device would end the client after live keeping for a short period of time. Hence, when detecting that the client is switched to the background, the state information of the target state where the client is at current time (e.g., a time when the client is switched to the background) is obtained, so that the terminal device performs live keeping on the client at the background and when the user switches the client from the background to the foreground, the client directly enters the target state, without reloading, to improve the use experience of the user.

The state information of the target state of the disclosure includes, for example but not limited to: an identity of the client (for example, an ID of the client), an identity of the target state (for example, an ID of the state), and a state type of the target state, where the state type of the target state includes: passively switching to background and actively switching to background S202: The client transmits a first request to a client server, the first request including the state information of the target state.

After the client obtains the state information of the target state of the client according to the steps above, the state information of the target state is included in the first request to be transmitted to the client server. The first request is used for requesting a target live keeping duration of the target state.

S203: The client server determines a target live keeping duration corresponding to the target state according to the state information of the target state.

In some embodiments, the client server determines a target live keeping duration corresponding to the target state according to the state information of the target state included in the first request after the client server receives the first request transmitted by the client.

In some embodiments, the client receives a target live keeping duration corresponding to the target information of the target state in the first request transmitted by the client server.

In some embodiments, the client includes multiple states. To save the resources of the terminal device, some states of the client are allowed to be subjected to live keeping, and some states of the client are not allowed to be subjected to live keeping. It may be set according to embodiments, and is not limited in the disclosure. The client server of the disclosure includes at least one preset live keepable state identification information (e.g., information of at least one state of the client that is allowed to be subjected to live keeping) of the client; in this way, after the client server obtains the first request transmitted by the client, the first request is analyzed, to obtain the state information of the target state included in the first request. The state information of the target state includes the identification information of the target state; in this way, the client server matches the identification information of the target state with the identification information of the preset live keepable state to determine whether the target state belongs to the preset live keepable state. If the target state is not the live keepable state, information on a live keeping failure is fed back to the client and the entire live keeping process ends. The target live keeping duration corresponding to the target state is determined according to the state information of the target state in response to determining that the target state belongs to the live keepable state. In an embodiment, the client server may receive a first request in a case that a client is switched to a background, the first request including state information of a target state where the client is at a current time; determining a target live keeping duration corresponding to the target state according to the state information of the target state; and transmitting the target live keeping duration corresponding to the target state to the client.

In the client server live keeping method according to an example embodiment, by receiving the first request when the client is switched to the background, the target live keeping duration corresponding to the target state may be determined based on the state information of the target state included in in the first request. By determining the target live keeping duration, the target live keeping duration corresponding to the target state may be transmitted to the client, so that the client performs flexible live keeping on the target state based on the target live keeping duration. Since live keeping may be performed on the target state, resources that would have otherwise been consumed when reloading the target state while the client is switched to the foreground may be saved.

The mode that the client server determines a target live keeping duration corresponding to the target state according to the state information of the target state in S203 above includes, but not limited to, Mode I and Mode II.

Mode I, S203 may include the following steps:

Step 1: The client server determines a type of the target state according to the state information of the target state.

Step 2: The client server determines a target live keeping duration corresponding to the target state according to the type of the target state.

In view of the above, the state information of the target state includes the type of the target state; the client may analyze the state information of the target state, to obtain the type of the target state, so as to determine the live keeping duration corresponding to the target state according to the type of the target state.

In an example, the determining a target live keeping duration corresponding to the target state according to the type of the target state in a case that the type of the target state is passively switching to background includes; determining a target operation currently causing the client to be switched to a background: obtaining historical data of the target operation; and determining a target live keeping duration corresponding to the target state according to a duration cost by executing the target operation in the historical data.

If the type of the target state is passively switching to background, the client server determines a target operation causing the client to be switched to the background, where the target operation may be a user behavior of the user; the target operation, for example, may be the user answering the phone or the user replying a message. Next, the client server obtains the historical data of the target operation, and determines a target live keeping duration corresponding to the target state according to a duration cost by executing the target operation by the user in the historical data of the target operation. For example, the target operation causing the client to be switched to the background is answering the phone; the client server may obtain a call duration every time the user answers the phone in a preset historical time period, and determine, according to the call duration every time of answering the phone, the target live keeping duration corresponding to the target state, for example, using an average value of the call duration every time the user answers the phone in the historical time period as the target live keeping duration corresponding to the target state. For example, the target operation causing the client to be switched to the background is replying the message; the client server may obtain a duration cost every time the user replies the message in a preset historical time period, and determine, according to the duration cost every time the user replies the message, the target live keeping duration corresponding to the target state, for example, using an average value of the duration cost every time the user replies the message in the historical time period as the target live keeping duration corresponding to the target state.

The target live keeping duration is determined according to the duration cost by the user behavior, and therefore, the probability of closing the target state when the execution of the user behavior is not completed may be reduced, so as to reduce the probability of needing to reload the target state when the execution of the user behavior is completed and the client is switched from the background to the foreground. Accordingly, the computer computing resource cost for reloading the target state is saved.

In an example, the determining a target live keeping duration corresponding to the target state according to the type of the target state in a case that the type of the target state is actively switching to background includes: obtaining a time interval for the client to enter a next state of the target state from the target state; determining a target live keeping duration corresponding to the target state according to the time interval for the client to enter the next state of the target state from the target state.

If the type of the target state is actively switching to background, the client server obtains a time interval for the client to enter the next state of the target state from the target state and determines a target live keeping duration corresponding to the target state according to the time interval for the client to enter the next state of the target state from the target state; for example, using the time interval for the client to enter the next state of the target state from the target state as the target live keeping duration corresponding to the target state.

The target live keeping duration is determined according to the time interval to enter the next state of the target state from the target state, and therefore, the probability of closing the target state when the next state is not entered may be reduced, so as to reduce the probability of needing to reload the target state. Accordingly, the computer computing resource cost for reloading the target state is saved.

In some embodiments, if the type of the target state is actively switching to background, but the time interval for the client to enter the next state of the target state from the target state is unknown, the client server may determine a preset live keeping duration as the target live keeping duration corresponding to the target state. The preset live keeping duration may be relatively short; in this way, during the following live keeping process, when reaching the preset live keeping duration and the next state of the client is not started yet, the client may continue to transmit the live keeping request in the manner described above.

In an embodiment, when transmission of the live keeping request reaches a preset time, to reduce the resources such as power consumed in performing live keeping on the target state continuously for a long period of time, the client may also close the target state.

In an embodiment, if the client above is a game client, the target state may include character dying or waiting the teammate to enter a next round; the next state of the target state may be when entering the next round with the team-mate.

Calculating the target live keeping duration corresponding to the target state in real time according to the state information of the target state may improve the flexibility of the determined live keeping duration.

Mode I, S203 described above may be understood as the client (or the client server) calculating the target live keeping duration corresponding to the target state in real time according to the state information of the target state. Mode II, S203 that will be described below may be understood as the client searching the target live keeping duration corresponding to the target state according to the previously calculated live keeping duration.

In an embodiment, before the determining a target live keeping duration corresponding to the target state according to the state information of the target state, the method further includes; determining whether the target state is a preset live keepable state according to the state information of the target state; determining a target live keeping duration corresponding to the target state according to the state information of the target state includes: determining a target live keeping duration corresponding to the target state according to the state information of the target state in response to determining that the target state is the preset live keepable state. Further determining the target live keeping duration when determining that the target state is the live keepable state may reduce the times for determining the unnecessary target live keeping durations.

In mode II, S203, the client server includes a first preset correspondence; the first preset correspondence includes the live keeping durations corresponding to multiple live keepable second preset states of the client: Mode II, S203 may include:

Step 1; the client server determines whether the target state is a second preset state according to the state information of the target state and the preset correspondence.

Step 2; the client server searches a target live keeping duration corresponding to the target state from a first preset correspondence in response to determining that the target state is the second preset state.

The client server of the disclosure includes the first preset correspondence; the first preset correspondence includes live keeping durations corresponding to a plurality of live keepable second preset states of the client, identification information of the second preset states, live keeping type information, and the like.

In an example, the first preset correspondence is shown in Table 1:

TABLE 1

| Serial number | Client identifier | Second preset state identifier | Second preset state type | Live keeping type | Live keeping duration |
|---|---|---|---|---|---|
| 1 | Client ID | State 1 ID | Passively switching to background | Fixed duration live keeping | A second |
| 2 | | State 2 ID | Passively switching to background | Fixed duration live keeping | B second |

TABLE 1-continued

| Serial number | Client identifier | Second preset state identifier | Second preset state type | Live keeping type | Live keeping duration |
|---|---|---|---|---|---|
| 3 | | State 3 ID | Actively switching to background | Non-fixed duration live keeping | C second |
| . . . | . . . | . . . | . . . | . . . | . . . |

Table 1 above is only an example, and each numeral value in Table 1 is only an example and does not limit the disclosure. The identifier of the client, the identifier of the second preset state, and the field type of the live keeping duration are may be, for example, integer types; the type of the second preset state and the field type of the live keeping type may be, for example, enumeration types.

Based on Table 1 above, the client server may first determine whether the target state is the second preset state in Table 1 according to the state information of the target state. If determining that the target state is the second preset state in Table 1 above, the target live keeping duration corresponding to the target state is searched in Table 1; for example, the target state is state 2 in Table 1 and the live keeping duration corresponding to state 2 is B second; and therefore, B second is used as the target live keeping duration corresponding to the target state.

The target live keeping duration corresponding to the target state is searched according to pre-calculated live keeping duration, and therefore, the computing duration consumed by computing the first live keeping duration in real time may be reduced, so as to improve the efficiency for determining the target live keeping duration.

The client server determines the target live keeping duration corresponding to the target state according to the steps above, and the execution is as S204 below.

S204: The client server transmits the target live keeping duration corresponding to the target state to the client.

The client receives a live keeping result of whether the target state is subjected to live keeping transmitted by the terminal device, and transmits the live keeping result of the target state to the client server.

S205: The client transmits a second request to the terminal device, the second request including state information of the target state and a target live keeping duration corresponding to the target state.

The second request may be understood as the live keeping request for requesting the terminal device to perform live keeping on the target state for the target live keeping duration. That is, after obtaining the target live keeping duration corresponding to the target state transmitted by the client server, the client generates a second request by combining the state information of the target state obtained by itself. When the terminal device receives the second request, the terminal device may determine the target live keeping duration for live keeping on the target state. Live keeping refers to keeping the client to be in a running state when the client is switched from the front-end (or foreground) to the background. In an example embodiment, live keeping may indicate, for example, that the live keeping of the target state may maintain a course for running the target state to be in a running state when the client represents the target state, in order to ensure the course to be in a running state. When the client is not switched from the background to the front-end yet when exceeding the target live keeping duration, the terminal device may end the course for running the target state.

In the client live keeping method according to an example embodiment, when the client is switched to the background, the state information of the target state where the client is at the current time is obtained; the first request including the state information may be transmitted to the client server, so that the client server may return the target live keeping duration based on the first request. By receiving the target live keeping duration, the second request including the target live keeping duration may be transmitted to the terminal device, so that the terminal device may perform flexible live keeping on the target state according to the target live keeping duration; in this way, not only the user experience of the user is improved, but also saved is the resource that would have otherwise been consumed by reloading the target state when switching the client to the front-end.

In some embodiments, information formats included by the second request are as shown in Table 2:

TABLE 2

| Serial number | Field name | Field type | Field explanation |
|---|---|---|---|
| 1 | App_id | Integer type | Client identifier |
| 2 | State_id | Integer type | State identifier |
| 3 | State_type | Enumeration type | State type: 1. Passively switching to background 2. Actively switching to background |
| 4 | Live_request | Enumeration type | Live keeping type: 1. Request fixed duration live keeping 2. Request non-fixed duration live keeping |
| 5 | Live_time | Integer type | Live keeping duration, unit being second |

Table 2 above is the format of information included in the second request; in an embodiment, Table 2 above to be included in the second request may be amended according to specific information of the target state; for example, the identifier of the state in Table 2 may be amended as the identifier of the target state, and the type of the state in Table 2 may be amended as the type of the target state. For example, if the type of the target state is passively switching to background, the column of the type of the target state may have a value '1'; and if the type of the target state is actively switching to background, the column of the type of the target state may have a value '2'. The live keeping type in Table 2 may be amended as the live keeping type corresponding to the target state; for example, if the live keeping type corresponding to the target state is fixed duration live keeping, the column of the live keeping type may have a value '1', and if the live keeping type corresponding to the target state is non-fixed duration live keeping, the column of the live keeping type may have a value '2'. The live keeping duration in Table 2 may be amended as a value of the target live keeping duration corresponding to the target state.

The client transmits the second request to the terminal device; the terminal device executes S206 below:

S206: The terminal device transmits the second request to a terminal server.

In some embodiments, after obtaining the second request transmitted by the client, the terminal device may analyze and check the second request, for checking whether the data format of the second request meets a protocol requirement, for example, detecting whether the field type of each field, the live keeping type, the state type, and the like meet the requirements in Table 2 above. If detecting that the data format of the second request is correct, the second request is transmitted to the terminal server. If detecting that the data format of the second request is incorrect, information on the second request no meeting the requirements is fed back to the client, so that the client re-transmits the second request.

S207: The terminal server determines whether the target state is legal (or permissible) for live keeping according to at least one of the state information of the target state in the second request and the target live keeping duration corresponding to the target state.

The mode that the terminal server determines whether a target state is legal (or permissible) in S207 above includes, but not limited to, the following Mode I and Mode II:

Mode I, S207, the terminal server determines that the target state is illegal (or impermissible) for live keeping in response to determining that the target live keeping duration corresponding to the target state is greater than a first preset duration. Due to limited terminal device resource, the terminal device cannot perform live keeping on the client for a long time; when the live keeping duration for the client requests to be subject to live keeping is greater than a first preset duration, it indicates that the client is a malicious client, so as to determine the target state is an impermissible state: no live keeping is performed on the type of impermissible target states; in this way, client live keeping safety is improved.

Mode II, S207 includes the following steps:

Step 1: The terminal server obtains historical live keeping request information corresponding to the client at a historical time according to the state information of the target state.

Step 2: The terminal server determines whether the target state is permissible according to the historical live keeping request information corresponding to the client.

The features of the malicious request are: requesting to perform live keeping on most states of the client (for example, more than 60%), or the requested live keeping time being long every time, for example, exceeding 10 minutes. It should be noted that 60% and 10 minutes above are both examples, and may be specifically determined according to actual needs.

On this basis, the terminal server performs big data analysis to determine whether the target state is permissible according to the historical live keeping request information of the client reported by different terminal devices. Determining whether the target state is permissible according to the historical live keeping request information of the client may improve the client live keeping safety.

In an example, the terminal server may determine state information that requests live keeping in the historical live keeping request information; determine the number of states that request live keeping by the client in a historical time period according to the state information that requests live keeping in the historical live keeping request information; and determine that the target state is impermissible in a case that the number of states that request live keeping in the historical time period is greater than a first preset value.

The terminal server determines the target state is impermissible by determining that the number of states that request live keeping by the client in a historical time period is greater than the first preset value according to the state information that requests live keeping in the corresponding historical live keeping request information of the client. Since when the number of states that request live keeping by the client in the historical time is greater than the first preset value, it may be considered that the client is a malicious client, by determining the target state provided by the malicious client as impermissible state, no live keeping processing may be performed on the impermissible state, so as to improve the client live keeping safety.

In an example, the terminal server may determine live keeping duration information requested in the historical live keeping request information; determine the number of states with the requested live keeping duration greater than a second preset duration according to the live keeping duration information requested in the historical live keeping request information; and determine that the target state is impermissible in a case that the number of states exceeds a second preset value.

The terminal server determines the target state is impermissible by determining that the live keeping duration requested by the number of states which exceeds the second preset value in the client is greater than the second preset duration (for example, 10 minutes), according to the live keeping duration information requested in the historical live keeping request information.

In an example, the terminal server determines the target state is impermissible by determining that the number of states that request live keeping by the client in a historical time period is greater than the first preset value according to the state information that requests live keeping in the historical live keeping request information and determining that the live keeping duration requested by the number of states which exceeds the second preset value in the client is greater than the second preset duration, according to the live keeping duration information requested in the historical live keeping request information. Since when the number of the states, that request the live keeping duration by the client in the historical time is greater than the second preset duration, is greater than the first preset value, it may be considered that the client is a malicious client, by determining the target state provided by the malicious client as impermissible state, no live keeping processing may be performed on the impermissible state, so as to improve the client live keeping safety.

When the terminal server determines that the target state is impermissible, the terminal server transmits the information of the live keeping failure to the terminal device; the terminal device above transmits the information of the live keeping failure to the client.

In the disclosure, when determining that the target state is impermissible, it is determined that the client is also impermissible at the same time, and the identification information of the impermissible client is saved in the terminal server.

The terminal server executes the step of S208 as follows when determining that the target state is permissible.

S208: The terminal server transmits target information to the terminal device in response to determining that the target state is permissible, the target information being used for indicating live keeping information of the target state. For example, the terminal server obtains a live keeping strategy, the live keeping strategy including a live keepable condition corresponding to a plurality of live keepable first preset Taking a first preset state in the live keeping strategy as an example, the information of the first preset state is as shown in Table 4:

TABLE 4

| Serial number | Field name | Field type | Field explanation | Remark |
|---|---|---|---|---|
| 1 | App_id | Integer type | Client identifier | |
| 2 | State_id | Integer type | State identifier | |
| 3 | State_type | Enumeration type | State type:<br>1. Passively switching to background<br>2. Actively switching to background | |
| 4 | Live_request | Enumeration type | Live keeping type:<br>1. Fixed duration live keeping<br>2. Non-fixed duration live keeping | |
| 5 | Live_time | Integer type | Live keeping time, unit being second | |
| 6 | CPU_load | Integer type | CPU load region | Generally divided into 5 regions from high to low |
| 7 | GPU_load | Integer type | GPU load region | Generally divided into 5 regions from high to low |
| 8 | Net_load | Integer type | Net load region | Generally divided into 5 regions from high to low |
| 9 | IO_load | Integer type | IO load region | Generally divided into 5 regions from high to low |
| 10 | Memory_load | Integer type | Used internal storage region | Generally divided into 5 regions from high to low |
| 11 | Live_status | Integer type | Is live keeping possible | | states of the client. Generate target information according to the live keepable condition in the live keeping strategy. Generating the target information may enable the terminal device to determine whether needing to perform live keeping on the target state based on the target information, so as to avoid unnecessary live keeping processes, so as to save resources such as power that would have been otherwise consumed during live keeping on the unnecessary live keeping processes.

In an example, information included in the live keeping strategy is as shown in Table 3:

TABLE 3

| State | CPU | GPU | Network | IO load | Internal memory |
|---|---|---|---|---|---|
| State 1 | A1 | C1 | D1 | E1 | F1 |
| State 2 | A2 | C2 | D2 | E2 | F2 |
| . . . | . . . | . . . | . . . | . . . | . . . |

Table 3 above shows a live keepable condition corresponding to each first preset state. The live keepable condition is a minimum resource needed when the terminal device performs live keeping on the target state. For example, when the terminal device includes state 1, the needed minimum CPU resource is A1, the needed minimum GPU resource is C1, the needed minimum net resource is D1, the needed minimum IO load resource is E1, and the needed minimum internal storage resource is F1.

In some embodiments, the live keeping strategy may also include the state identifier, state type, live keeping type, live keeping time, and other information of the first preset state.

Table 4 above shows information corresponding to one live keepable first preset state in the live keeping strategy; information of other first preset states may be consistent with Table 4 above. Related parameters in Table 4 above may be replaced by information of the target first preset state.

When determining that the target state is permissible, the terminal server of the disclosure generates the target information according to the information shown in Table 3 or Table 4, and transmits the generated target information to the terminal device; the target information is used for indicating the live keeping information of the target state, for example, for indicating the information in Table 4.

S209: The terminal device determines whether to perform live keeping on the target state according to the target information.

The terminal device determines, according to the user request and by combining with the current resource situation of the terminal device, whether to perform live keeping on the target state, so as to improve the reliability and flexibility of the client live keeping. Descriptions of the following embodiments may be referenced to for details. Details are not described herein again.

The client live keeping method provided by the embodiment of the disclosure may transmit a first request to a client server when a client is switched to a background; and determine, by the client server, a target live keeping duration for a target state where the client is according to the first request. The client includes state information of the target state and the target live keeping duration in a second request to be transmitted to a terminal device, to request the terminal device to perform live keeping on the target state. The terminal device transmits the second request to a terminal server; the terminal server generates target information according to the second request; the target information is used for indicating live keeping information of the target state; the terminal device determines whether to perform live keeping on the target state according to the target information, so as to implement flexible live keeping on the target state according to user needs, so as to improve the user experience of the user.

Figure 3:
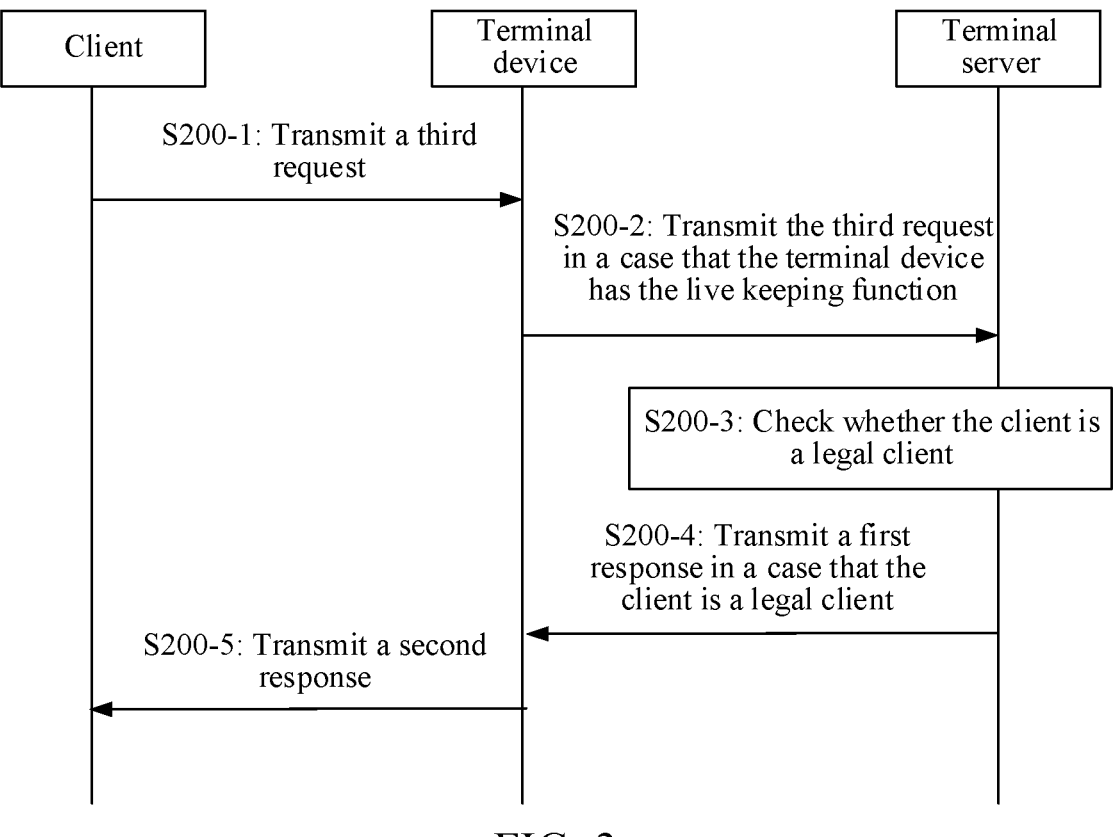
FIG. 3 is a schematic flowchart of a client live keeping method provided by an embodiment of the disclosure.

In some embodiments, before S201 as shown in FIG. 3, the method of the embodiment of the disclosure further includes:

S200-1: The client transmits a third request to the terminal device, the third request is used for searching whether the terminal device has a live keeping function, and the third request includes identification information of the client.

S200-2: The terminal device transmits the third request to the terminal server in a case that the terminal device has the live keeping function.

The client of the disclosure requests the terminal device to perform live keeping on the target state: first, it needs to determine whether the terminal device supports the technical solution of the disclosure, i.e., determining whether the terminal device has the live keeping function. Specifically, the client transmits the third request to the terminal device: after receiving the third request, the terminal device transmits the third request to the terminal server if the terminal device itself has the live keeping function. If the terminal device does not have the live keeping function, the terminal device returns the information of the live keeping failure to the client.

S200-3: The terminal server checks whether the client is a permissible client according to the identification information of the client.

The terminal server stores identification information of the impermissible client, matches the identification information of the client included in the third request with the identification information of the impermissible client, and checks whether the client is the permissible client. If the identification information of the client matches with the identification information of the impermissible client, it is determined that the client is an impermissible client. The terminal server returns the live keeping failure information to the terminal device. If the identification information of the client does not match with the identification information of the impermissible client, it is determined that the client is a permissible client. The terminal server executes S200-4 as follows.

S200-4: The terminal server transmits a first response to the terminal device in response to checking that the client is the permissible client, the first response being used for indicating that the client is a permissible client.

S200-5: The terminal device transmits a second response to the client according to the first response, the second response being used for indicating that the terminal device has the live keeping function.

After receiving the second response, the client establishes a communication link with the terminal device to start to execute the live keeping request steps of S201 to S209 above.

After determining the client is the permissible client, the first response is further transmitted to the terminal device, so as to improve the live keeping safety of the client.

An execution body in the disclosure for determining whether to perform live keeping on the target state based on the live keeping strategy may be the terminal device, and may also be the terminal server.

Figure 4:
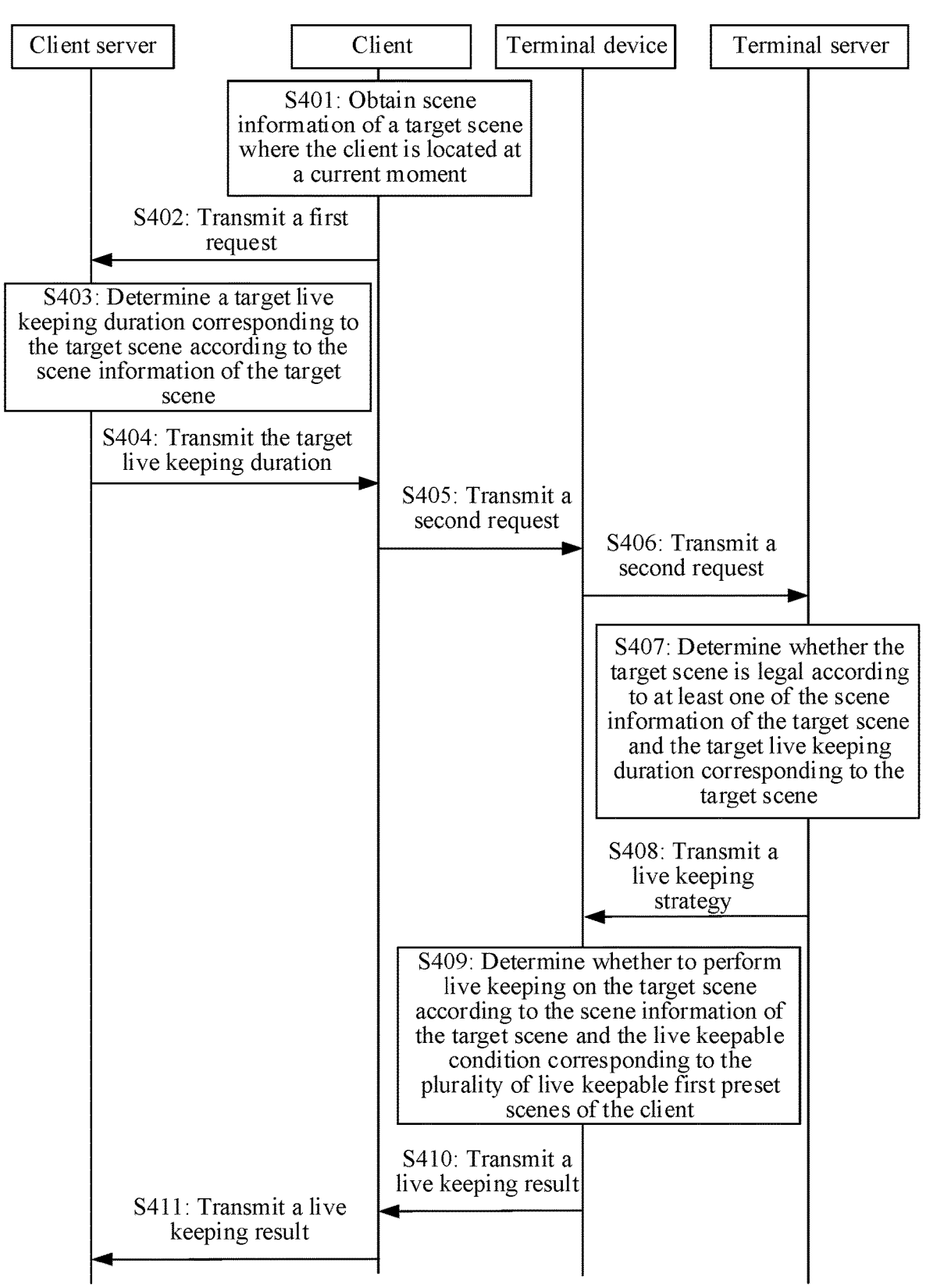
FIG. 4 is a schematic flowchart of a client live keeping method provided by an embodiment of the disclosure.

By combining with FIG. 4, the process of determining, by the terminal device, whether to perform live keeping on the target state based on the live keeping strategy is described in details.

FIG. 4 is a schematic flowchart of a client live keeping method provided by an embodiment of the disclosure, which includes S401-S411 as shown in FIG. 4:

S401: A client obtain state information of a target state where the client is at a current time in a case that the client is switched to a background.

S402: The client transmits a first request to a client server, the first request including the state information of the target state.

S403: The client server determines a target live keeping duration corresponding to the target state according to the state information of the target state.

S404: The client server transmits the target live keeping duration corresponding to the target state to the client.

S405: The client transmits a second request to the terminal device, the second request including state information of the target state and a target live keeping duration corresponding to the target state.

S406: The terminal device transmits the second request to a terminal server.

S407: The terminal server determines whether the target state is permissible according to at least one of the state information of the target state and the target live keeping duration corresponding to the target state.

The implementing processes of S401 to S407 above are consistent with the implementing processes of S201 to S207 and are omitted herein by referring to the specific descriptions of S202 to S207 above.

S408: The terminal server transmits the live keeping strategy to the terminal device when determining that the target state is permissible.

This step may be understood as an example implementing mode of S208 above. In this implementing mode, the terminal server carries the live keeping strategy in the target information to be transmitted to the terminal device.

The live keeping strategy is as shown in Table 3 or Table 4, and includes a live keepable condition corresponding to a plurality of live keepable first preset states of the client.

S409: The terminal device determines whether to perform live keeping on the target state according to the state information of the target state and the live keepable condition corresponding to the plurality of live keepable first preset states of the client.

Specifically, the terminal device obtains a first preset state matching the state information of the target state in the live keeping strategy according to the state information of the target state, so as to determine whether to perform live keeping on the target state according to the live keepable condition corresponding to the first preset state. For example, when the terminal device meets the live keepable condition corresponding to the first preset state, determine to perform live keeping on the target state: if the terminal device does not meet the live keepable condition corresponding to the first preset state, determine to skip performing live keeping on the target state.

Performing live keeping on the first preset state only when determining the terminal device meets the live keepable condition corresponding to the first preset state may reduce the unnecessary live keeping on the target state, so as to save resources such as power consumed when performing unnecessary live keeping on the target state.

In some embodiments, as shown in Table 3 or Table 4, the live keepable condition corresponding to the first preset state includes the resource value needed by the terminal device when performing live keeping on the first preset state; in an embodiment, S409 above includes the following steps:

Step 1: The terminal device determines whether the target state is the first preset state according to the state information of the target state.

Step 2: The terminal device obtains an idle resource value of the terminal device of a current time in response to determining that the target state is the first preset state.

Step 3: The terminal device determines whether to perform live keeping on the target state according to the idle resource value of the terminal device and the resource value needed by the terminal device to perform live keeping on the target state.

In an embodiment, the client live keeping method may compare the state information of the target state with the identification information of each of the first preset states in the live keeping strategy and determine whether the target state matches with one of the first preset states in the live keeping strategy. If matching succeeds, the method may determine the target state as the first preset state. Furthermore, the terminal device obtains the idle resource value at the current time and the minimum resource needed by the terminal device when determining the resource value corresponding to the first preset state in the live keeping strategy as the live keeping target state, and determine whether to perform live keeping on the target state according to the idle resource value of the terminal device and the resource value needed by the terminal device when performing live keeping on the target state.

In an example, the client live keeping method may determine to perform live keeping on the target state in a case that the resource value needed by the terminal device when performing live keeping on the target state is less than a preset resource value and the idle resource value of the terminal device is greater than or equal to a prediction resource value. The prediction resource value is a minimum resource value needed and predicted by the terminal device in a case that the terminal device runs a front-end program at a next time. The prediction process is a known art, and is omitted herein for concision.

By performing live keeping on the target state only when determining that the idle resource value of the terminal device is greater than or equal to the prediction resource value, the probability for a live keeping failure caused by insufficient idle resources may be reduced.

In an example, the client live keeping method may include determining to skip performing live keeping on the target state in a case that the resource value needed by the terminal device in performing live keeping on the target state is greater than or equal to the preset resource value; that is, if the resources to be occupied by performing live keeping on the target state of the client is too large, skip performing live keeping on the target state; in this way, the use rate of the resources is saved.

In an example, the client like keeping method may determine to skip performing live keeping on the target state in a case that the idle resource value of the terminal device is less than the prediction resource value; that is, if the resources of the terminal device at the current time is insufficient, skip performing live keeping on the target state; in this way, the resource shortage is reduced, so that the probability for running failures of remaining clients located at the front-end is reduced.

In some embodiments, the terminal device checks its own idle resources in real time; in a case that the terminal device performs live keeping on the target state, when the terminal device detects that the idle resource value of the terminal device at the next time is less than the prediction resource value, it stops performing live keeping on the target state at the next time; the prediction resource value may be understood as the minimum resource value needed by the terminal device for running the front-end program at the next time of the next time predicted by the terminal device.

In some embodiments, the terminal device stops performing live keeping on the target state in response to detecting, by the terminal device, that a target live keeping duration corresponding to the target state is reached in a case that the terminal device performs live keeping on the target state.

By stopping performing live keeping on the target state in time, the resource consumed when performing live keeping on the target state may be used for executing more important courses, so as to ensure the normal execution of the terminal device.

In some embodiments, the disclosure further includes the following steps:

S410: The terminal device transmits a live keeping result of whether the target state is subjected to live keeping to the client.

S411: The client transmits the live keeping result of whether the target state is subjected to live keeping to the client server.

In some embodiments, the live keeping results transmitted by the terminal device to the client are as shown in Table 5:

TABLE 5

| Serial number | Field name | Field type | Field explanation |
|---|---|---|---|
| 1 | App__id | Integer type | Client identifier |
| 2 | State__id | Integer type | State identifier |
| 3 | Live__result | Enumerator type | Live keeping result: 0. Live keeping as required 1. Live keeping cannot be performed due to current resource shortage 2. Live keeping forbidden due to excessive malicious live keeping requests issued by the client |

As shown in Table 5, if the terminal device determines to perform live keeping on the target state, the live keeping result is 0, i.e., performing live keeping on the target state according to the client requirements. If the terminal device determines that the idle resource value of the terminal device is less than the prediction resource value, the live keeping result is 1, i.e., indicating that live keeping cannot be performed on the target state due to current resource shortage of the terminal device. If the terminal server determines that the client is an impermissible client, the live keeping result is 2, i.e., indicating that the client issues excessive malicious live keeping requests, live keeping on the target state is not allowed.

After obtaining Table 5 by the client server, if the reason that no live keeping is allowed for the target state is because the client issues excessive malicious live keeping requests, so that live keeping is not allowed, the client server updates the state information allowing live keeping stored by itself, and updates the target state as the state not allowing live keeping. In this way, when the client transmits the first request to the client server subsequently, the client server returns live keeping failure information to the client, so as to improve the live keeping accuracy and avoid resource wastes.

In some embodiments, if no live keeping may be performed on the target state of the client due to resource shortage of the terminal device, the terminal device may store the saved current running state of the client locally; when the user re-enters the client, the current running state of the client saved by the terminal device may be loaded, avoiding re-operation of all steps by the user, which may also improve the user experience to some extent.

In some embodiments, when the terminal device performs live keeping on the target state of the client and when the client checks that the client enters the next state of the target state, a notification message is transmitted to the user; the notification message is used for notifying the user to return to the client.

In some embodiments, the terminal device performs live keeping on the target state of the client and the target state type is actively switching to the background: after one live keeping period ends, i.e., reaching the target live keeping duration corresponding to the target state, the client checks that the client does not enter the next state of the target state; then the client re-transmits the first request to the client server, to continue execution of the live keeping steps above, requesting the terminal device to continue live keeping on the target state.

In the client live keeping method provided by the embodiment of the disclosure, when the client is switched to the background, a second request transmitted when the client is switched to the background is received, and the second request is transmitted to the terminal server, so that the terminal server determines the live keeping information according to the second request, so that the terminal device performs flexible live keeping on the target state according to the determined live keeping information; in this way, not only the user experience of the user is improved, but also the resource that would have otherwise been consumed by reloading the target state when the client is switched to the front-end is saved.

In addition, in the disclosure, subdividing the states of the client enables the terminal device to combine the idle resources of the terminal device and the live keeping requirements of the user, to perform live keeping on the target state or end the target state to save resources of the terminal device, so as to balance the tradeoff between the use experience of the user and the resource shortage of the terminal device. In addition, the terminal device in the disclosure determines whether to perform live keeping on the target state according to the idle resource value of the terminal device and the resource value needed by the terminal device to perform live keeping on the target state. The times for interactions in the entire live keeping process are few, so as to improve the live keeping efficiency.

Figure 5:
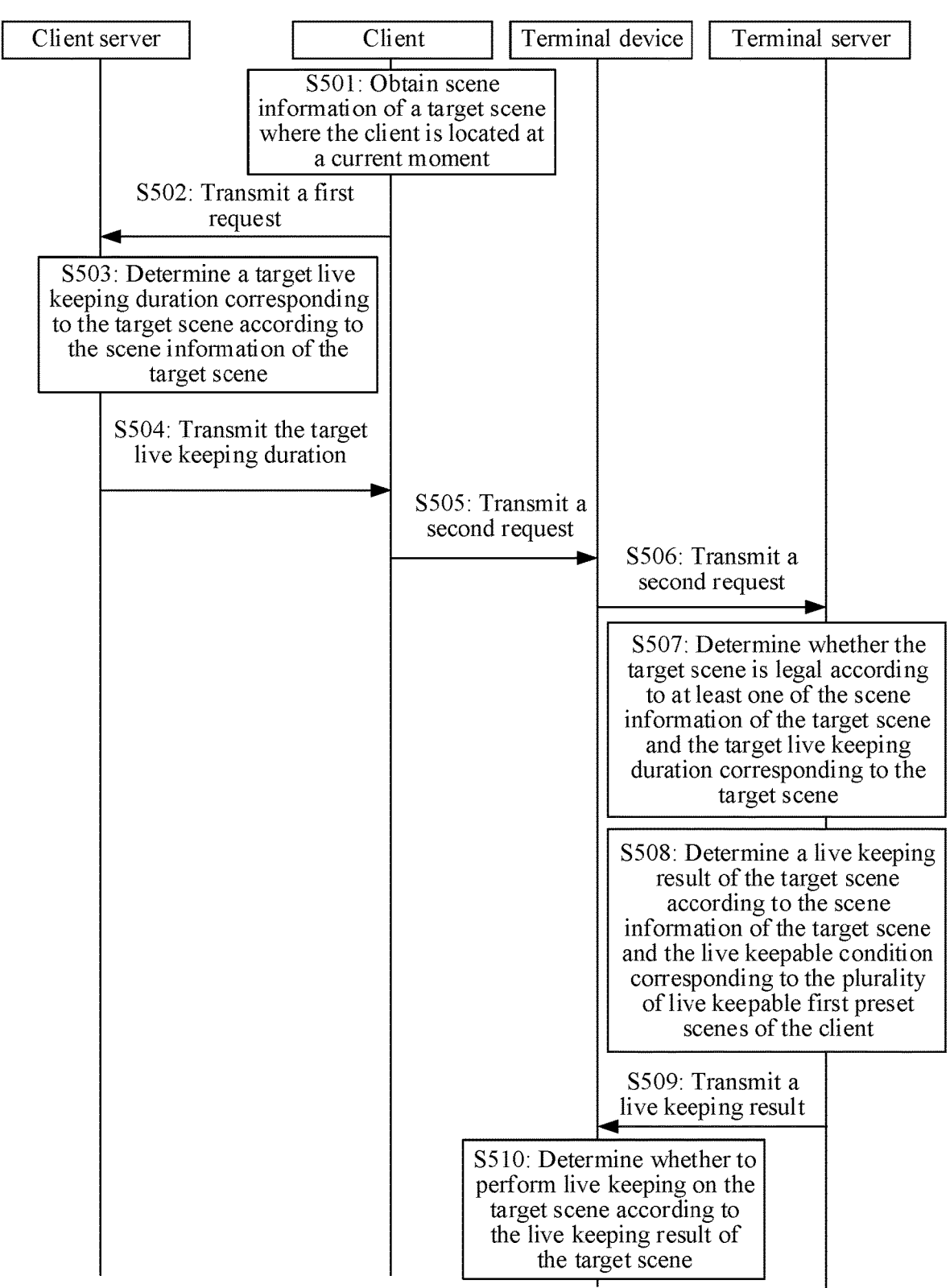
FIG. 5 is a schematic flowchart of a client live keeping method provided by an embodiment of the disclosure.

By combining with FIG. 5, the process of determining, by the terminal server, whether to perform live keeping on the target state based on the live keeping strategy is described in details.

FIG. 5 is a schematic flowchart of a client live keeping method provided by an embodiment of the disclosure, which includes as shown in FIG. 5:

S501: A client obtain state information of a target state where the client is located at a current time in a case that the client is switched to a background.

S502: The client transmits a first request to a client server, the first request including the state information of the target state.

S503: The client server determines a target live keeping duration corresponding to the target state according to the state information of the target state.

S504: The client server transmits the target live keeping duration corresponding to the target state to the client.

S505: The client transmits a second request to the terminal device, the second request including state information of the target state and a target live keeping duration corresponding to the target state.

S506: The terminal device transmits the second request to a terminal server.

S507: The terminal server determines whether the target state is permissible according to at least one of the state information of the target state and the target live keeping duration corresponding to the target state.

The implementing processes of S401 to S407 above are consistent with the implementing processes of S201 to S207 and are omitted herein by referring to the specific descriptions of S202 to S207 above.

S508: The terminal server determines the live keeping result of the target state according to the state information of the target state and the live keepable condition corresponding to the plurality of live keepable first preset states of the client in the live keeping strategy when determining that the target state is permissible.

This step may be understood as a specific implementing mode of S208 above. In this implementing mode, the terminal server determines the live keeping result of the target state according to the live keeping strategy and the state information of the target state.

In some embodiments, as shown in Table 3 or Table 4, the live keepable condition corresponding to the first preset state includes the resource value needed by the terminal device when performing live keeping on the first preset state: at this time, S508 above includes:

Step 1: The terminal server determines whether the target state is the first preset state according to the state information of the target state.

Step 2: The terminal server obtains an idle resource value of the terminal device of a current time in response to determining that the target state is the first preset state.

Step 3: The terminal server determines the live keeping result of the target state according to the idle resource value of the terminal device and the resource value needed by the terminal device to perform live keeping on the target state.

The implementing processes of steps 1-3 above included in S508 are consistent with the implementing processes of steps 1-3 included in S409 and are omitted herein by referring to the specific descriptions of steps 1-3 included in S409. In some embodiments, step 3 of S508 above includes; determining that the live keeping result of the target state is live keeping in a case that the resource value needed by the terminal device to perform live keeping on the target state is less than a preset resource value and the idle resource value of the terminal device is greater than or equal to a prediction resource value; where the prediction resource value is the minimum resource value needed when the terminal device runs the front-end program at the next time predicted by the terminal device: or determining that the live keeping result of the target state is skipping live keeping in a case that the resource value needed by the terminal device to perform live keeping on the target state is greater than or equal to the preset resource value: or determining that the live keeping result of the target state is skipping live keeping in a case that the idle resource value of the terminal device is less than the prediction resource value.

S509: The terminal server transmits the live keeping result of the target state to the terminal device.

S510: The terminal device determines whether to perform live keeping on the target state according to the live keeping result of the target state.

In the disclosure, the process of determining whether to perform live keeping on the target state is implemented by the terminal server; the terminal device executes, according to the live keeping result determined by the terminal server, whether to perform live keeping on the target state. For example, determine to perform live keeping on the target state in a case that the live keeping result of the target state is live keeping. Determine to skip performing live keeping on the target state in a case that the live keeping result of the target state is skipping live keeping.

In some embodiments, the terminal server transmits a first live keeping stop indication to the terminal device in response to detecting that the idle resource value of the terminal device at the next time is less than the prediction resource value in a case that the terminal device performs live keeping on the target state. The first live keeping stop indication is used for indicating the terminal device to stop live keeping on the target state. The terminal device stops live keeping on the target state according to the first live keeping stop indication.

In some embodiments, the terminal server transmits a second live keeping stop indication to the terminal device in response to detecting that a target live keeping duration corresponding to the target state is reached in a case that the terminal device performs live keeping on the target state. The first live keeping stop indication is used for indicating the terminal device to stop live keeping on the target state. The terminal device stops live keeping on the target state according to the second live keeping stop indication.

Receiving the first live keeping stop instruction or second live keeping stop instruction may stop live keeping on the target state in time according to the first live keeping stop instruction or second live keeping stop instruction, so as to save the resources consumed during live keeping on the target state.

In some embodiments, the target information includes a live keeping result of the target state, and the generating target information according to the live keeping strategy includes; determining a live keeping result of the target state according to the state information of the target state and the live keepable condition corresponding to the plurality of live keepable first preset states of the client.

The live keeping strategy includes the live keepable condition corresponding to the plurality of live keepable first preset states of the client. The terminal server may determine the live keepable condition matching the state information of the target state and determine the live keeping result of the target state according to the determined live keepable condition.

In some embodiments, the live keepable condition corresponding to the first preset state includes the resource values required by the terminal device to keep the first preset state alive, and the determining a live keeping result of the target state according to the state information of the target state and the live keepable condition corresponding to the plurality of live keepable first preset states of the client includes; determining whether the target state is the first preset state according to the state information of the target state: obtaining an idle resource value of the terminal device of a current time in response to determining that the target state is the first preset state; determining a live keeping result of the target state according to the idle resource value of the terminal device and the resource value needed by the terminal device to perform live keeping on the target state.

The terminal device determines whether to perform live keeping on the target state according to the live keepable condition, which may reduce the workload of the terminal device, so as to save the resources of the terminal device, to further improve the possibility for the terminal device to perform live keeping on the target state.

In some embodiments, the disclosure further includes the following steps:

Step 1: The terminal device transmits a live keeping result of whether the target state is subjected to live keeping to the client.

Step 2: The client transmits the live keeping result of whether the target state is subjected to live keeping to the client server.

The implementing processes of S508 to SS510 above are consistent with the implementing processes of S409 to S411 and are omitted herein by referring to the specific descriptions of S409 to S411 above.

In the disclosure, subdividing the states of the client enables the terminal device server to combine the idle resources of the terminal device and the live keeping requirements of the user, to determine whether to perform live keeping on the target state or end the target state to save resources of the terminal device, so as to balance the contradiction between the use experience of the user and the resource shortage of the terminal device. In addition, the terminal server in the disclosure determines, according to the idle resource value of the terminal device and the resource value needed by the terminal device when performing live keeping on the target state, a live keeping result of whether to perform live keeping on the target state; the terminal device determines whether to perform live keeping on the target state according to the live keeping result, which reduces the workload of the terminal device, so as to save the resources of the terminal device, to further improve the possibility for the terminal device to perform live keeping on the target state.

It should be understood that FIG. 2 to FIG. 5 are merely examples of the disclosure, and cannot be understood as the limitation to the disclosure.

The preferred implementations of the disclosure are described in detail above with reference to the accompanying drawings. However, the disclosure is not limited to the specific details in the foregoing implementations. A plurality of simple deformations may be made to the technical solution of the disclosure within a range of the technical concept of the disclosure, and these simple deformations fall within the protection scope of the disclosure. For example, the specific technical features described in the above specific implementations may be combined in any suitable manner without contradiction. To avoid unnecessary repetition, various possible combinations are not further described in the disclosure. For another example, various different implementations of the disclosure may alternatively be combined randomly. Such combinations should also be considered as the content disclosed in the disclosure provided that these combinations do not depart from the concept of the disclosure.

By combining with FIG. 2 to FIG. 5 above, the method embodiments of the disclosure are described in details; the apparatus embodiment of the disclosure would be described in details by combining with FIG. 6 to FIG. 10.

Figure 6:
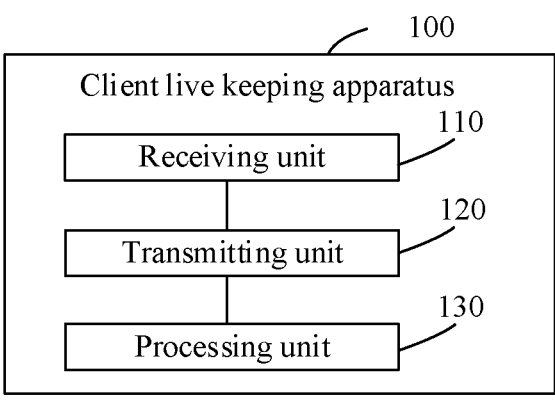
FIG. 6 is a schematic structural diagram of a client live keeping apparatus provided by an embodiment of the disclosure.

FIG. 6 is a schematic structural diagram of a client live keeping apparatus provided by an embodiment of the disclosure. The client live keeping apparatus 100 is applied to the terminal device; the client live keeping apparatus 100 may be the terminal device or a component of the terminal device; as shown in FIG. 6, the client live keeping apparatus 100 may include:

> a receiving unit 110, configured to receive a second request in a case that a client is switched to a background, the second request including state information of a target state where the client is located at a current time and a target live keeping duration corresponding to the target state;
>
> a transmitting unit 120, configured to transmit the second request to a terminal server;
>
> the receiving unit 110, further configured to receive target information determined by the terminal server according to the second request, the target information being used for indicating live keeping information of the target state;
>
> a processing unit 130, configured to determine whether to perform live keeping on the target state according to the target information.

In some embodiments, the target information includes a live keeping strategy, and the live keeping strategy includes a live keepable condition corresponding to a plurality of live keepable first preset states of the client. The processing unit 130 is specifically used for determining whether to perform live keeping on the target state according to the state information of the target state and the live keepable condition corresponding to the plurality of live keepable first preset states of the client.

In some embodiments, the live keepable condition corresponding to the first preset states includes a resource value needed by the terminal device to perform live keeping on the first preset states, and the processing unit 130 is specifically used for determining whether the target state is the first preset state according to the state information of the target state: obtaining an idle resource value of the terminal device of a current time in response to determining that the target state is the first preset state; determining whether to perform live keeping on the target state according to the idle resource value of the terminal device and the resource value needed by the terminal device to perform live keeping on the target state.

In some embodiments, the processing unit 130 is specifically used for determining whether to perform live keeping on the target state in a case that the resource value needed by the terminal device to perform live keeping on the target state is less than a preset resource value and the idle resource value of the terminal device is greater than or equal to a prediction resource value: otherwise, determining to skip performing live keeping on the target state; where the prediction resource value is a minimum resource value needed and predicted by the terminal device in a case that the terminal device runs a front-end program at a next time.

In some embodiments, the processing unit 130 is further used for stopping performing live keeping on the target state in response to detecting that the idle resource value of the terminal device at the next time is less than the prediction resource value in a case that the terminal device performs live keeping on the target state.

In some embodiments, the processing unit 130 is further used for stopping performing live keeping on the target state in response to detecting that a target live keeping duration corresponding to the target state is reached in a case that the terminal device performs live keeping on the target state.

In some embodiments, the target information includes the live keeping result of the target state, and the processing unit 130 is further used for determining to perform live keeping on the target state in a case that the live keeping result of the target state is live keeping; determining to skip performing live keeping on the target state in a case that the live keeping result of the target state is skipping live keeping.

In some embodiments, the receiving unit 110 is further used for receiving a first live keeping stop indication transmitted by the terminal server and stopping performing live keeping on the target state according to the first live keeping stop indication, the first live keeping stop indication being transmit in a case that the terminal server detects that the idle resource value of the terminal device at the next time is less than the prediction resource value.

In some embodiments, the receiving unit 110 is further used for receiving a second live keeping stop indication transmitted by the terminal server and stopping performing live keeping on the target state according to the second live keeping stop indication, the second live keeping stop indication being transmit in a case that the terminal server detects that the target live keeping duration corresponding to the target state is reached.

In some embodiments, the receiving unit 110 is further used for, before receiving the second request from the client, receiving a third request from the client and determining whether the terminal device has a live keeping function according to the third request.

The transmitting unit 120 is further used for transmitting the third request to the terminal server in a case that the terminal device has the live keeping function.

The receiving unit 110 is further used for receiving a first response transmitted by the terminal server according to the third request, the first response being used for indicating that the client is a permissible client.

The transmitting unit 120 is further used for transmitting a second response to the client according to the first response, the second response being used for indicating that the terminal device has the live keeping function.

In some embodiments, the transmitting unit 120 is further used for transmitting the live keeping result of whether the target state is subjected to live keeping to the client.

It is to be understood that the apparatus embodiment and the method embodiment may correspond to each other. For a similar description, reference may be made to the method embodiment. To avoid repetition, details are not described herein again. Specifically, The client live keeping apparatus 100 shown in FIG. 6 may execute the method of the embodiment of the disclosure, and preceding and other operations and/or functions of each unit in the client live keeping apparatus 100 are respectively used for implementing corresponding processes in each method; for concision, they are omitted herein.

Figure 7:
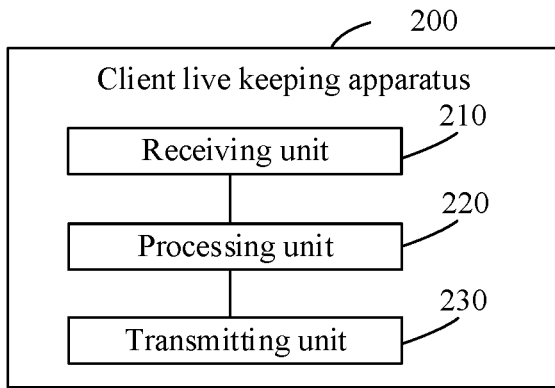
FIG. 7 is a schematic structural diagram of a client live keeping apparatus provided by an embodiment of the disclosure.

FIG. 7 is a schematic structural diagram of a client live keeping apparatus provided by an embodiment of the disclosure. The client live keeping apparatus 200 is applied to the terminal server; the client live keeping apparatus 200 may be the terminal server or a component of the terminal server; as shown in FIG. 7, the client live keeping apparatus 200 may include:

> a receiving unit 210, configured to receive a second request from the terminal device, the second request including state information of a target state where the client is located at a current time and a target live keeping duration corresponding to the target state;
>
> a processing unit 220, configured to determine whether the target state is permissible according to at least one of the state information of the target state and the target live keeping duration corresponding to the target state;

a transmitting unit 230, configured to transmit target information to the terminal device in response to determining that the target state is permissible, the target information being used for indicating live keeping information of the target state, and the target information being used for triggering the terminal device to determine whether to perform live keeping on the target state according to the target information.

In some embodiments, the processing unit 220 is specifically used for determining that the target state is impermissible in response to determining that the target live keeping duration corresponding to the target state is greater than a first preset duration.

In some embodiments, the processing unit 220 is specifically used for obtaining historical live keeping request information corresponding to the client at a historical time according to the state information of the target state; determining whether the target state is permissible according to the historical live keeping request information corresponding to the client.

In some embodiments, the processing unit 220 is specifically used for determining state information that requests live keeping in the historical live keeping request information; determining the number of states that request live keeping by the client in a historical time period according to the state information that requests live keeping in the historical live keeping request information; determining that the target state is impermissible in a case that the number of states that request live keeping in the historical time period is greater than a first preset value.

In some embodiments, the processing unit 220 is specifically used for determining live keeping duration information requested in the historical live keeping request information; determining the number of states with the requested live keeping duration greater than a second preset duration according to the live keeping duration information requested in the historical live keeping request information; determining that the target state is impermissible in a case that the number of states with the live keeping duration greater than the second preset duration exceeds a second preset value.

In some embodiments, the processing unit 220 is further used for obtaining a live keeping strategy, the live keeping strategy including a live keepable condition corresponding to a plurality of live keepable first preset states of the client; generating target information according to the live keepable condition in the live keeping strategy.

In some embodiments, the target information includes the live keeping strategy.

In some embodiments, the target information includes the live keeping result of the target state. The processing unit 220 is specifically used for determining the live keeping result of the target state according to the state information of the target state and the live keepable condition corresponding to the plurality of live keepable first preset states of the client in the live keeping strategy.

In some embodiments, the live keepable condition corresponding to the first preset states includes a resource value needed by the terminal device to perform live keeping on the first preset states, and the processing unit 220 is specifically used for determining whether the target state is the first preset state according to the state information of the target state: obtaining an idle resource value of the terminal device of a current time in response to determining that the target state is the first preset state; determining a live keeping result of the target state according to the idle resource value of the terminal device and the resource value needed by the terminal device to perform live keeping on the target state.

In some embodiments, the processing unit 220 is specifically used for determining that the live keeping result of the target state is live keeping in a case that the resource value needed by the terminal device to perform live keeping on the target state is less than a preset resource value and the idle resource value of the terminal device is greater than or equal to a prediction resource value; otherwise, determining that the live keeping result of the target state is skipping live keeping; where the prediction resource value is a minimum resource value needed and predicted by the terminal device in a case that the terminal device runs a front-end program at a next time.

In some embodiments, the processing unit 220 is further used for controlling the transmitting unit 230 to transmit a first live keeping stop indication to the terminal device in response to detecting that the idle resource value of the terminal device at the next time is less than the prediction resource value in a case that the terminal device performs live keeping on the target state.

In some embodiments, the processing unit 220 is further used for controlling the transmitting unit 230 to transmit a second live keeping stop indication to the terminal device in response to detecting that a target live keeping duration corresponding to the target state is reached in a case that the terminal device performs live keeping on the target state.

In some embodiments, the receiving unit 210 is also used for, before receiving the second request from the terminal device, receiving a third request from the terminal device, the third request indicating that the terminal device has a live keeping function, and the third request including identification information of the client.

The processing unit 220 is also used for checking whether the client is a permissible client according to the identification information of the client.

The transmitting unit 230 is also used for transmitting a first response to the terminal device in response to checking that the client is the permissible client, the first response being used for indicating that the client is a permissible client.

It is to be understood that the apparatus embodiment and the method embodiment may correspond to each other. For a similar description, reference may be made to the method embodiment. To avoid repetition, details are not described herein again. Specifically, The client live keeping apparatus 200 shown in FIG. 7 may execute the method of the embodiment of the disclosure, and preceding and other operations and/or functions of each unit in the client live keeping apparatus 200 are respectively used for implementing corresponding processes in each method; for concision, they are omitted herein.

Figure 8:
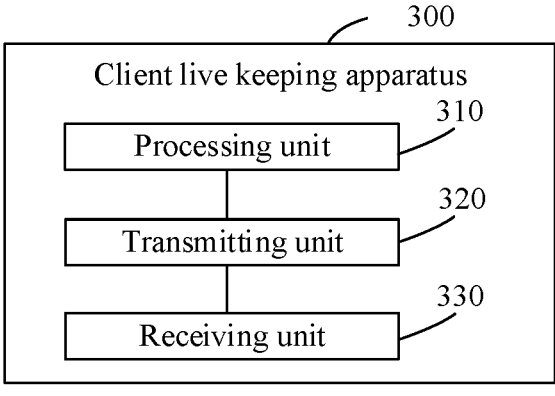
FIG. 8 is a schematic structural diagram of a client live keeping apparatus provided by an embodiment of the disclosure.

FIG. 8 is a schematic structural diagram of a client live keeping apparatus provided by an embodiment of the disclosure. The client live keeping apparatus 300 is applied to the client; the client live keeping apparatus 300 may be the client or a component of the client; as shown in FIG. 8, the client live keeping apparatus 300 may include:

a processing unit 310, configured to obtain state information of a target state where the client is located at a current time in a case that the client is switched to a background;

a transmitting unit 320, configured to transmit a first request to a client server, the first request including the state information of the target state;

a receiving unit 330, configured to receive a target live keeping duration corresponding to the target state transmitted by the client server;

the transmitting unit 320, further configured to transmit a second request to the terminal device, the second request including state information of the target state and a target live keeping duration corresponding to the target state; the second request being used for indicating the terminal device to transmit the second request to the terminal server, and after receiving the target information which is returned by the terminal server and used for indicating the live keeping information of the target state, determining whether to perform live keeping on the target state according to the target information.

In some embodiments, the transmitting unit 320 is also used for transmitting a third request to the terminal device, the third request being used for searching whether the terminal device has a live keeping function.

The receiving unit 330 is also used for receiving a second response transmit from the terminal device, the second response being used for indicating that the terminal device has the live keeping function.

In some embodiments, the receiving unit 330 is also used for receiving a live keeping result of whether the target state is subjected to live keeping transmitted by the terminal device. The transmitting unit 320 is also used for transmitting the live keeping result of the target state to the client server.

In some embodiments, when the target state is in a live keeping state, the transmitting unit 320 is further used for checking that the client enters the next state of the target state, a notification message is transmitted to the user; the notification message is used for notifying the user to return to the client.

In some embodiments, the transmitting unit 320 is also used for, when the type of the target state is the actively switching to the background, transmitting the first request to the client server again in response to checking that the target live keeping duration corresponding to the target state is reached and the client does not enter a next state of the target state.

It is to be understood that the apparatus embodiment and the method embodiment may correspond to each other. For a similar description, reference may be made to the method embodiment. To avoid repetition, details are not described herein again. Specifically, The client live keeping apparatus 300 shown in FIG. 8 may execute the method of the embodiment of the disclosure, and preceding and other operations and/or functions of each unit in the client live keeping apparatus 300 are respectively used for implementing corresponding processes in each method; for concision, they are omitted herein.

Figure 9:
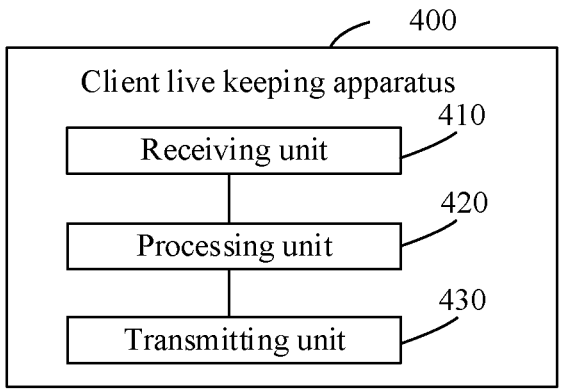
FIG. 9 is a schematic structural diagram of a client live keeping apparatus provided by an embodiment of the disclosure.

FIG. 9 is a schematic structural diagram of a client live keeping apparatus provided by an embodiment of the disclosure. The client live keeping apparatus 400 is applied to the client server; the client live keeping apparatus 400 may be the client server or a component of the client server; as shown in FIG. 9, the client live keeping apparatus 400 may include:

a receiving unit 410, configured to receive a first request in a case that a client is switched to a background, the first request including state information of a target state where the client is located at a current time;

a processing unit 420, configured to determine a target live keeping duration corresponding to the target state according to the state information of the target state;

a transmitting unit 430, configured to transmit the target live keeping duration corresponding to the target state to the client; the target live keeping duration being used for triggering the terminal device running the client to transmit a second request to a terminal server, the second request carrying state information of the target state and the target live keeping duration, and also being used for triggering the terminal device to determine whether to perform live keeping on the target state according to the target information after receiving the target information which is returned by the terminal server and used for indicating the live keeping information of the target state.

In some embodiments, the processing unit 420 is specifically configured to determine the type of the target state according to the state information of the target state; determining a target live keeping duration corresponding to the target state according to the type of the target state.

In some embodiments, the processing unit 420 is specifically used for determining a target operation causing the client to be switched to a background at the current time if the type of the target state is the passively switching to the background: obtaining historical data of the target operation; determining a target live keeping duration corresponding to the target state according to a duration cost by executing the target operation by the user in the historical data.

In an embodiment, the target operation includes the user answering the phone or the user replying the message.

In some embodiments, the processing unit 420 is specifically configured to determine the next state of the target state if the type of the target state is actively switching to background: obtaining a time interval for the client to enter the next state of the target state from the target state; determining a target live keeping duration corresponding to the target state according to the time interval for the client to enter the next state of the target state from the target state.

In some embodiments, the processing unit 420 is also used for determining the preset live keeping duration as the target live keeping duration corresponding to the target state when the time interval between the target state and the next state of the target state is unknown.

In an embodiment, if the client is a game client, the target state includes character dying or waiting the teammate to enter a next round.

In some embodiments, the processing unit 420 is also used for determining whether the target state belongs to the preset live keepable state according to the state information of the target state; determining a target live keeping duration corresponding to the target state according to the state information of the target state in response to determining that the target state is the preset live keepable state.

In some embodiments, in a case that the client server includes a first preset correspondence and the preset first correspondence includes a live keeping duration corresponding to a plurality of live keepable second preset states of the client, the processing unit 420 is specifically used for determining whether the target state is the second preset state according to the state information of the target state and the preset correspondence: searching a target live keeping duration corresponding to the target state from the first preset correspondence in response to determining that the target state is the second preset state.

In some embodiments, the receiving unit 410 is also used for receiving a live keeping result of whether the target state may be subjected to live keeping transmitted by the client. The processing unit 420 is used for updating the live keepable state information stored by the client server according to the live keeping result of the target state.

It is to be understood that the apparatus embodiment and the method embodiment may correspond to each other. For a similar description, reference may be made to the method embodiment. To avoid repetition, details are not described herein again. Specifically, The client live keeping apparatus 400 shown in FIG. 9 may execute the method of the embodiment of the disclosure, and preceding and other operations and/or functions of each unit in the client live keeping apparatus 400 are respectively used for implementing corresponding processes in each method; for concision, they are omitted herein.

Figure 10:
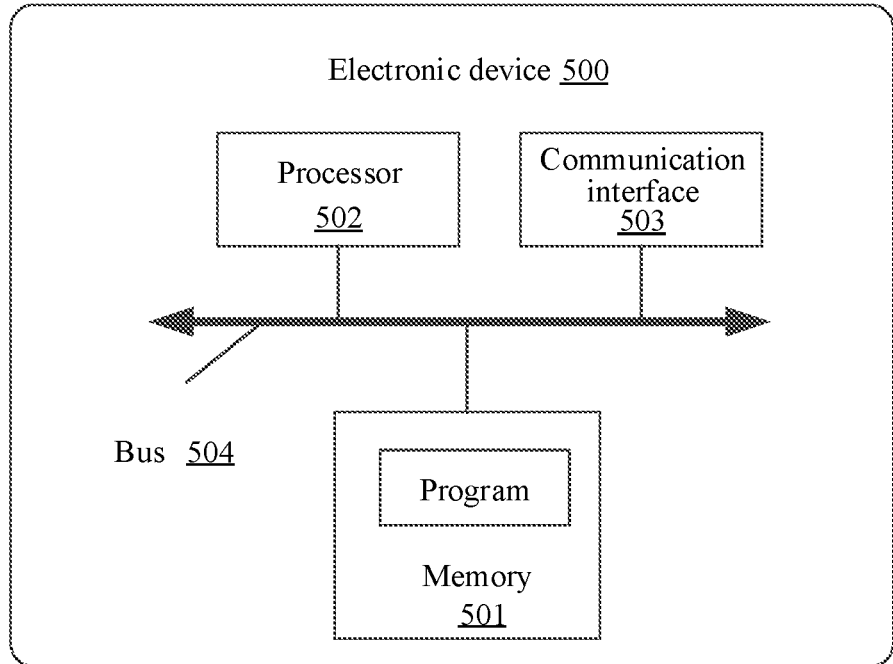
FIG. 10 is a block diagram of an electronic device involved in an embodiment of the disclosure.

FIG. 10 is a block diagram of an electronic device involved in an embodiment of the disclosure. The electronic device is used for executing the method of the embodiment above. The electronic device shown in FIG. 10 may be the terminal device, terminal server, or client server. Please refer to the explanations in the method embodiment for details.

The electronic device 500 shown in FIG. 10 includes a memory 501, a processor 502, and a communication interface 503. The memory 501, processor 502, and communication interface 503 are in communicative connection with each other. For example, the communicative connection among the memory 501, processor 502, and communication interface 503 may be implemented by means of network connection. Alternatively, the electronic device 500 may further include a bus 504. The memory 501, the processor 502, and the communication interface 503 communicate with each other through the bus 504. FIG. 10 relates to an electronic device 500 with the implemented communicative connection among the memory 501, processor 502, and communication interface 503 through the bus 504.

The memory 501 may be a read-only memory (ROM), a static storage device, a dynamic storage device, or a random access memory (RAM). The memory 501 may store programs; when the programs stored in the memory 501 are executed by the processor 502, the processor 502 and the communication interface 503 are used for executing the method above.

The processor 502 may use a general-purpose central processing unit (CPU), a microprocessor, an application specific integrated circuit (ASIC), a graphics processing unit, (GPU), or one or more integrated circuits.

The processor 502 may further be an integrated circuit chip and has a signal processing capability. In an implementation process, steps in the disclosure may be implemented by using a hardware integrated logical circuit in the processor 502, or by using instructions in a form of software. The processor 502 may further be a general-purpose processor, a digital signal processor (DSP), an ASIC, a field programmable gate array (FPGA), or other programmable logic devices, discrete gate or transistor logic devices, and discrete hardware components. The general-purpose processor may be a microprocessor, or the processor may be any conventional processor or the like. The software module may be located in a mature storage medium in the field, such as a random access memory, a flash memory, a read-only memory, a programmable read-only memory, an electrically-erasable programmable memory, or a register. The storage medium is located in the memory 501. The processor 502 reads information in the memory 501, and completes the method in the embodiments of the disclosure in combination with hardware thereof.

The communication interface 503 uses a transceiver module, for example, but not limited to, a transceiver, to implement communication between the electronic device 500 and other devices or communications networks. For example, a data set may be obtained through the communication interface 503.

When the electronic device 500 includes the bus 504, the bus 504 may include paths for delivering information among each part of the electronic device 500 (such as the memory 501, processor 502, and communication interface 503).

According to an aspect of the disclosure, a computer storage medium is provided, storing a computer program, the computer program when executed by a computer, causing the computer to perform the methods in the foregoing method embodiments. Or, the embodiment of the disclosure further provides a computer program product including instructions, the instructions, when executed by a computer, causing the computer to perform the methods in the foregoing method embodiments.

According to another aspect of the disclosure, a computer program product or a computer program is provided, including computer instructions, and the computer instructions being stored in a computer-readable storage medium. A processor of a computer device reads the computer instructions from the computer-readable storage medium, and executes the computer instructions, causing the computer device to implement the methods in the foregoing method embodiments.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on a computer, the procedures or functions according to the embodiments of the disclosure are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, a computer, a server, or a data center to another website, computer, server, or data center in a wired (such as, a coaxial cable, an optical fiber, or a digital subscriber line (DSL)) or wireless (such as, infrared, radio, or microwave) manner. The computer-readable storage medium may be any usable medium accessible by a computer, or a data storage device, such as a server or a data center, including one or more usable media. The usable medium may be a magnetic medium (such as, a floppy disk, a hard disk, or a magnetic tape), an optical medium (such as, a DVD), a semiconductor medium (such as, a solid state disk (SSD)), or the like.

A person of ordinary skill in the art may be aware that the exemplary module and algorithm steps described with reference to the embodiments disclosed in this specification may be implemented by electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of the disclosure.

In the several embodiments provided in the disclosure, it is to be understood that the disclosed system, apparatus, and method may be implemented in other manners. For example, the described apparatus embodiment is merely exemplary. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or modules may be implemented in electronic, mechanical, or other forms.

The modules described as separate parts may or may not be physically separate, and parts displayed as modules may or may not be physical modules, i.e., may be located in one position, or may be distributed on a plurality of network units. Some or all of the modules may be selected according to actual requirements to implement the objectives of the solutions of the embodiments. For example, functional modules in the embodiments of the disclosure may be integrated into one processing module, or each of the modules may exist alone physically, or two or more modules may be integrated into one module.

The foregoing descriptions are merely specific implementations of the disclosure, but are not intended to limit the protection scope of the disclosure. Any variation or replacement readily figured out by a person skilled in the art within the technical scope disclosed in the disclosure shall fall within the protection scope of the disclosure. Therefore, the protection scope of the disclosure shall be subject to the protection scope of the claims.

What is claimed is:

1. A client live keeping method, performed by a terminal device, comprising:
receiving, from a client based on the client being switched to a background, a request comprising state information of a target state of the client at a current time and a target live keeping duration corresponding to the target state, wherein
the state information comprises information on whether a type of the target state is passively switching to the background or actively switching to the background, and
the target live keeping duration is obtained in a different manner depending on whether the type of the target state is passively switching or actively switching to the background;
transmitting the request to a terminal server;
receiving, from the terminal server in response to the request, target information indicating live keeping information of the target state;
determining whether to perform live keeping on the target state based on the target information; and
performing the live keeping on the target state or skipping performing the live keeping on the target state based on a result of the determining.

2. The method according to claim 1, wherein the target information comprises a live keeping strategy, and the live keeping strategy comprises a live keepable conditions respectively corresponding to a plurality of live keepable first preset states of the client; and
the determining whether to perform the live keeping on the target state based on the target information comprises:
determining whether to perform live keeping on the target state based on the state information of the target state and a live keepable condition corresponding to a first preset state, among the plurality of live keepable first preset states, of the client that matches the state information of the target state.

3. The method according to claim 2, wherein the live keepable condition corresponding to the first preset state comprises a resource value needed by the terminal device to perform live keeping on the first preset state, and the determining whether to perform the live keeping on the target state based on the state information of the target state and the live keepable condition corresponding to the first preset state comprises:
obtaining an idle resource value of the terminal device of the current time, based on determining that the target state is the first preset state; and
determining whether to perform the live keeping on the target state based on the idle resource value of the terminal device and the resource value needed by the terminal device to perform the live keeping on the target state.

4. The method according to claim 3, wherein the determining whether to perform the live keeping on the target state based on the idle resource value of the terminal device and the resource value needed by the terminal device to perform the live keeping on the target state comprises:
determining to perform the live keeping on the target state based on the resource value needed by the terminal device to perform the live keeping on the target state being is-less than a preset resource value and the idle resource value of the terminal device being greater than or equal to a prediction resource value; or
otherwise, determining to skip performing the live keeping on the target state; and
wherein the prediction resource value is a minimum resource value needed and predicted for running a front-end program at a next time.

5. The method according to claim 4, further comprising:
stopping performing the live keeping on the target state based on detection that the idle resource value of the terminal device at the next time, with performing the live keeping on the target state, is predicted to be less than the prediction resource value.

6. The method according to claim 4, further comprising:
stopping performing the live keeping on the target state based on detection that the target live keeping duration corresponding to the target state is reached.

7. The method according to claim 1, wherein the target information comprises a live keeping result of the target state; and the determining whether to perform the live keeping on the target state according to the target information comprises:
determining to perform the live keeping on the target state based on the live keeping result indicating to perform the live keeping; and
determining to skip performing the live keeping on the target state based on the live keeping result indicating to skip the live keeping.

8. The method according to claim 1, wherein the determining comprises determining to perform the live keeping on the target state based on the target information, and the method further comprises:
receiving, from the terminal server, a live keeping stop indication and stopping performing the live keeping on the target state based on the live keeping stop indication, the live keeping stop indication being based on detection that an idle resource value of the terminal device at a next time, with performing the live keeping on the target state, is less than a prediction resource value, wherein the prediction resource value is a minimum resource value needed and predicted for running a front-end program at the next time.

9. The method according to claim 1, wherein the determining comprises determining to perform the live keeping on the target state based on the target information, and the method further comprises:

receiving, from the terminal server, a live keeping stop indication and stopping performing the live keeping on the target state based on the live keeping stop indication, the live keeping stop indication being based on detection that the target live keeping duration corresponding to the target state is reached.

10. The method according to claim 1, wherein before the receiving the request from the client, the method further comprises:

receiving another request from the client and determining whether the terminal device has a live keeping function according to the another request;

transmitting the another request to the terminal server based on the terminal device having the live keeping function;

receiving a first response from the terminal server in response to the another request, the first response indicating that the client is a permissible client; and transmitting a second response to the client based on the first response, the second response indicating that the terminal device has the live keeping function.

11. A client live keeping apparatus, comprising:

at least one memory configured to store program code; and at least one processor configured to read the program code and operate as instructed by the program code, the program code including:

request receiving code configured to cause the at least one processor to receive, from a client based on the client being switched to a background, a request comprising state information of a target state of the client at a current time and a target live keeping duration corresponding to the target state, wherein the state information comprises information on whether a type of the target state is passively switching to the background or actively switching to the background, and the target live keeping duration is obtained in a different manner depending on whether the type of the target state is passively switching or actively switching to the background;

transmitting code configured to cause the at least one processor to transmit the request to a terminal server;

information receiving code configured to cause the at least one processor to receive, from the terminal server in response to the request, target information indicating live keeping information of the target state;

determining code configured to cause the at least one processor to make a determination whether to perform live keeping on the target state based on the target information; and live keeping code configured to cause the at least one processor to perform the live keeping on the target state or skip performing the live keeping on the target state based on a result of the determination.

12. The method according to claim 1, wherein the target live keeping duration is calculated, in real time, according to a first manner based on the type of the target state being passively switching to the background, or according to a second manner that is different from the first manner based on the type of the target state being actively switching to the background.

13. The method according to claim 1, wherein the target live keeping duration is obtained using a preset correspondence between the type of the target state and a live keeping duration.

14. The method according to claim 1, wherein the receiving the target information comprises receiving, from the terminal server in response to the request, target information indicating live keeping information of the target state of which content varies depending on a determination whether the client is a malicious client, wherein the client is determined as the malicious client based on the target live keeping duration included in the request being greater than a preset duration or a number of states in which the client requests live keeping in a historical time period being greater than a preset value.

15. The method according to claim 14, wherein, based on a determination that the client is the malicious client, no live keeping is allowed on the terminal device.

* * * * *